W. AHLEN.
CAR COUPLING AND COUPLING OPERATING MECHANISM.
APPLICATION FILED JULY 18, 1912.

1,114,570.

Patented Oct. 20, 1914.
2 SHEETS—SHEET 1.

WITNESSES
R. D. Little
W. C. Lyon

INVENTOR
William Ahlen
by Linthicum Belt & Fuller
his Attorneys

W. AHLEN.
CAR COUPLING AND COUPLING OPERATING MECHANISM.
APPLICATION FILED JULY 18, 1912.

1,114,570.

Patented Oct. 20, 1914.
2 SHEETS—SHEET 2.

WITNESSES

INVENTOR
William Ahlen

UNITED STATES PATENT OFFICE.

WILLIAM AHLEN, OF DUQUESNE, PENNSYLVANIA.

CAR-COUPLING AND COUPLING-OPERATING MECHANISM.

1,114,570.  Specification of Letters Patent.  Patented Oct. 20, 1914.

Application filed July 18, 1912. Serial No. 710,122.

*To all whom it may concern:*

Be it known that I, WILLIAM AHLEN, a subject of the King of Sweden, residing at Duquesne, in the county of Allegheny and State of Pennsylvania, have invented a new and useful Car-Coupler and Coupler-Operating Mechanism, of which the following is a specification.

My invention relates to the construction of car couplers, and operating mechanism therefor, and more particularly relates to the construction of car couplers used on mold cars employed in casting ingots and in handling and transporting ingot molds in the ingot casting and mold stripping operations.

One object of this invention is to provide a car coupler having novel means whereby the detachable coupling links are mechanically held in position in recesses in the ends of the cars so as to automatically enter the recess or opening in the abutting end of an adjoining car to which the cars are to be coupled and in this way avoid the necessity of entering the coupling links by hand in the car coupling operations, and another object of my invention is to provide improved means for operating the car coupler in uncoupling the cars whereby the liability of accident or injury to the workmen in coupling the cars is avoided and overcome.

Figure 1:
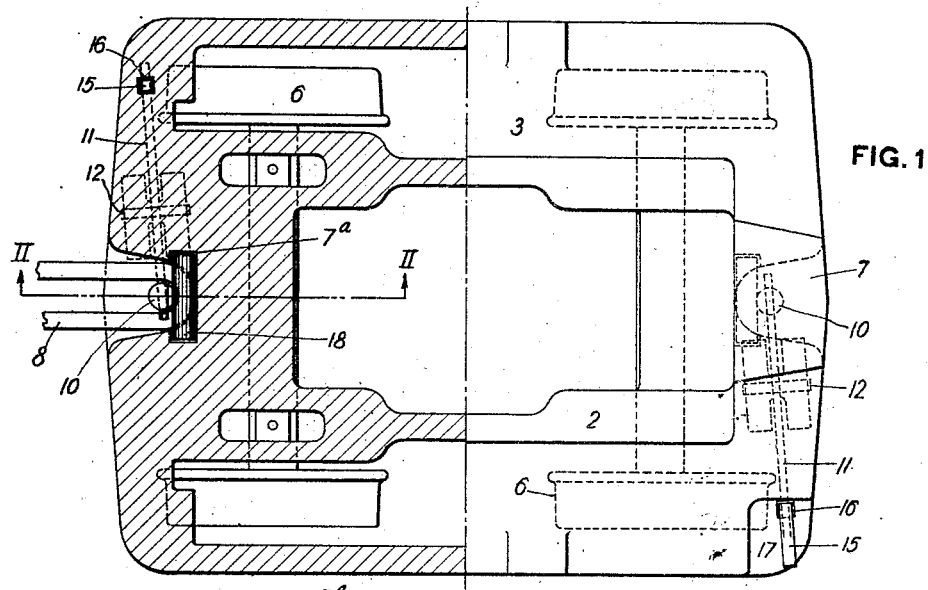
Figure 2:
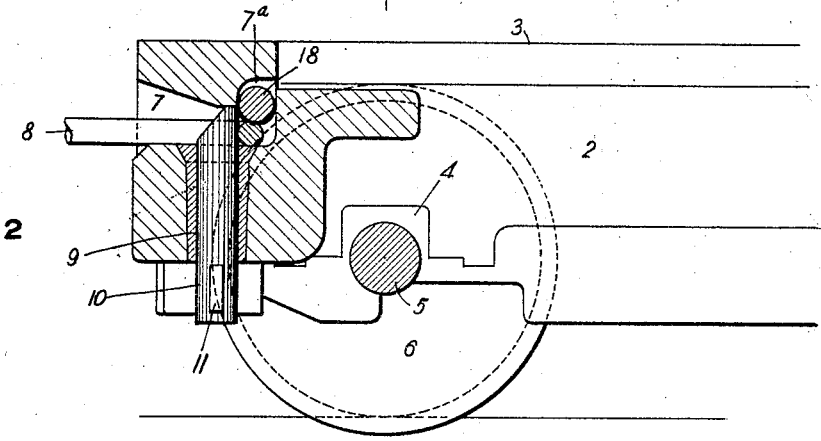
Figure 3:
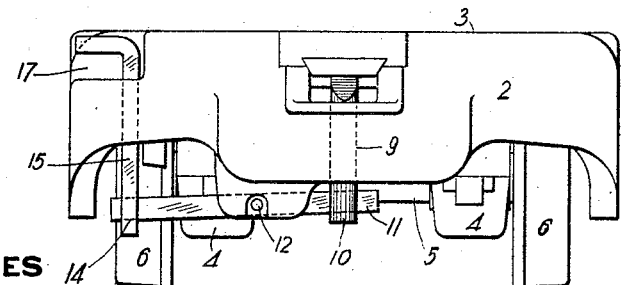
Figure 4:
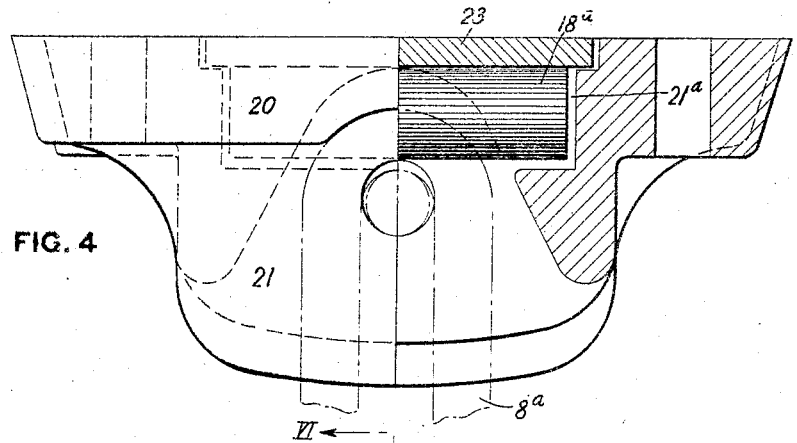
Figure 5:
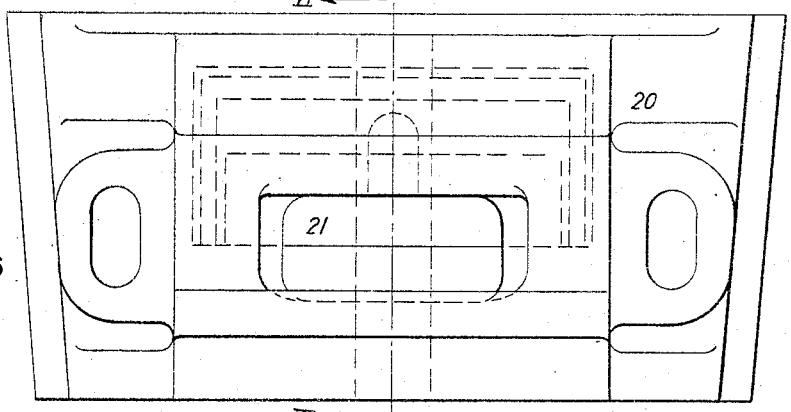
Figure 6:
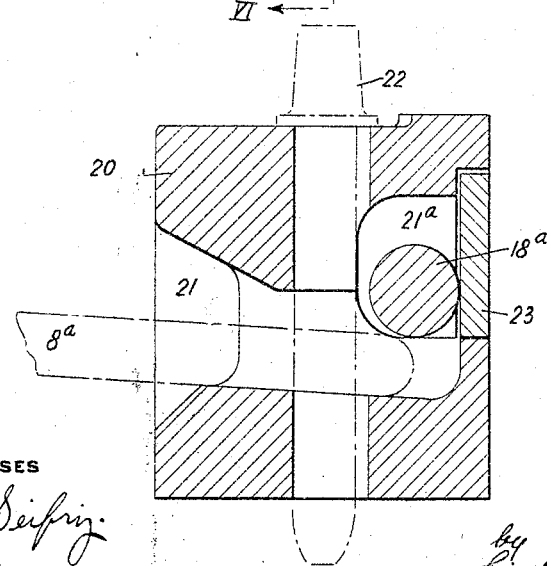

In the drawings, Figure 1 is a plan partly in section showing a mold car having a car coupler thereon as constructed and arranged in accordance with my invention. Fig. 2 is a sectional side elevation on an enlarged scale showing one end of the mold car having a car coupler and coupler operating mechanism constructed in accordance with this invention, the section being taken on the line II—II on Fig. 1. Fig. 3 is an end elevation of the car shown in Figs. 1 and 2. Fig. 4 is a plan, partly in section, showing my improved car coupler as applied to the removable draw head or bumper of a modified car construction in which the draw head is removably fastened on the end of the car body. Fig. 5 is an end elevation of the draw head shown in Fig. 4. Fig. 6 is a sectional side elevation, taken on the line VI—VI of Fig. 5.

In the drawings, referring to Figs. 1, 2 and 3, the numeral 2 designates the body of an ingot mold car on which the ingot molds are mounted, the molds standing on end on mold stools removably secured on the top face 3 of the car, in being transported from place to place. The car body 2 is provided with bearings 4 for the axles 5 on which the track wheels 6 are secured. In this construction substantially the entire upper surface of the car body is occupied by the mold stools and ingot molds. The construction of the running gear of the cars, not forming part of my invention, is not further described. On each end of the car is a horizontally extending opening or recess 7 into which the coupling links 8 extend and also in the ends of the car are vertically extending recesses or holes 9 in which a vertically movable coupling pin 10 is positioned. Each coupling pin 10 is arranged to move vertically in its recess 9 and its lower end is connected to one end of the lever 11 pivoted on a pin 12 at an intermediate point in its length to the car body 2. The outer end of the lever 11 extends into the recess 14 in the lower end of the lifting rod 15, which is positioned within the vertical opening 16 adjoining one side at the ends of the car body. A recess 17 is provided on the upper face of the car body in diagonally opposite corners of the car in which the bent upper end or handle of the rods 15 are located. The lifting rods 15 being constructed so as to be heavier than the pins 10 will act as a counterbalance and raise the coupling pin end of the lever 11 so as to always maintain the pin 10 in its raised or operative position as shown in Fig. 2. The rear end 7ª of the recess 7 is enlarged, and mounted in the enlarged rear end of this recess is a roller or weight 18 which has a limited vertical movement in the enlarged end 7ª of the recess 7. The downward movement of this roller 18 is limited by engagement of its ends with the offsets formed at the ends of the enlarged recess 7ª. The recess 7 is flared outwardly on its side surfaces so as to permit of a limited swinging movement in a horizontal plane of the coupling links placed therein, the sides of these recesses limiting the sidewise movement of the link so that the projecting outer ends of the links will always enter the openings for the links in the opposite end of the car being coupled to the car having the link secured thereon.

In the drawhead construction shown in Figs. 3, 4 and 5, the drawhead 20 has a horizontally extending recess 21 extending inwardly from the outer face thereof in which the coupling links 8ª are inserted, this recess flaring outwardly and its side walls limiting the swinging movement of the coupling links 8ª when held therein by the coupling pins 22. In this construction, the coupling pins 22 are inserted and removed by hand. The rear end 21ª of the recess 21 is enlarged so as to permit the insertion of the roller or weight 18ª by which the link 8ª is held in position, and by engagement with the end of the link 8ª hold this link in the substantially horizontal position necessary to insure the outer overhanging end of the link entering the corresponding recess 21 in the drawhead of the next car. The width of the end 21ª of the recess 21 is greater than that of the recess 21 so that the ends or weights of the rollers 18ª rest on the bottom of the recess and maintain the weights in position to be lifted by the end of the links 8ª when the links engage therewith in the coupling operations. A removable plate 23 is provided to close the rear end of the enlarged end 21ª of recess 21 and, when the drawhead 20 is secured to a car body this plate 22 is held in position in the rabbeted recess provided for it at the rear face of the drawhead.

In the operation of the apparatus referring to the construction shown in Figs. 1, 2 and 3, the coupling link 8 is held in position in the recess 7 by means of the coupling pin 10. When a link 8 is inserted in the recess 7 so that one end encircles the coupling pin 10 the end of the pin will be engaged by the vertically movable roller forming the counterweight 18. The weight of this roller 18 is sufficient to hold the link in a horizontal position so that its outer overhanging end projects forwardly in substantial alinement with the recess 7 in end of an adjoining car to be coupled thereto. When the cars are being coupled, the link 8 will enter the recess 7 and by striking the inclined face of the upper end of the pin 10 will cause the pin to be depressed in the recess in which it is mounted. When the end of the link 8 passes the pin 10 the then depressed pin 10 will be released and, through the connecting lever 11 and lifting rod 15, be again raised into lifted position as shown in Fig. 2 so as to enter the opening in the link 8 and prevent the withdrawal of the coupling link from the drawhead. When it is desired to disconnect the cars, the lifting rod 15 is grasped and raised manually. This movement of the lifting rod 15 through the connecting lever 11 moves the coupling pin 8 downwardly within its recess 9 so as to release the coupling pin 10 and, by holding the lifting rod 15 in its raised position until one car has been moved a sufficient distance relatively to the adjoining car, the cars are quickly disengaged or uncoupled.

With the construction shown in Figs. 4, 5 and 6, the lever operating mechanism for manipulating the coupling pin is not employed, and the usual coupling pin 8ª is employed in connecting the cars together. In this construction it is only necessary to insert the coupling pin in its opening and the projecting end of the link 10ª is thereby held by the roller or weight 18ª in position to enter the recess 21 in the adjacent car to be coupled.

In the construction of Figs. 4, 5 and 6, the end of the coupling link 10ª is held in the drawhead of one car in the desired horizontal position by means of the roller 18ª in the same manner as has been hereinbefore described, and the cars are coupled in the same way. In this construction the coupling pins 8ª are lifted out of the recesses when it is desired to uncouple the cars and by using the drawhead construction shown in Figs. 4, 5 and 6 room is provided between the ends of the coupled cars which is not taken up by the molds and stools and the use of the ordinary coupling pins is thereby made possible.

The advantages of my invention will be apparent to those skilled in the art. By the use of the roller to form a counterbalance weight which automatically engages with the end of the coupling links, the outer projecting ends of the links are held in position to enter the recesses in the ends of adjoining cars so as to couple the cars without being operated manually during the coupling operations. The uncoupling mechanism provides a safe means for detaching the cars without danger and enables the whole top surface to be utilized by the ingot molds.

Modifications in the construction and arrangement of the parts may be made without departing from my invention as defined in the claims.

I claim:—

1. A car coupler comprising in combination a car having a recessed end, said recess having an enlarged inner end, a coupling pin verticaly movable within said recess and arranged to engage and detachably secure a coupling link within said recess, and a lengthwise horizontal cylindrical roller inclosed within said recess and having end portions projecting into the enlarged end of said recess and arranged to engage the entering end of the coupling links, said roller being arranged to yieldingly support said links in causing the links to project in the desired direction from said recess.

2. A car coupler comprising in combination a car having a recessed end, said recess having an enlarged inner end, a coupling pin vertically movable within said recess and arranged to engage and detachably secure a coupling link within said recess, a lengthwise horizontal cylindrical roller inclosed within said recess and having end portions projecting into the enlarged end of said recess and arranged to engage the entering end of the coupling links, said roller being arranged to yieldingly support said links in causing the links to project in the desired direction from said recess, and means for manually moving the coupling pin into link releasing position.

In testimony whereof, I have hereunto set my hand.

WILLIAM AHLEN.

Witnesses:
T. E. McDOWELL,
GEO. L. NEFF.

Copies of this patent may be obtained for five cents each, by addressing the "Commissioner of Patents, Washington, D. C."